United States Patent [19]
Tank et al.

[11] Patent Number: 5,925,820
[45] Date of Patent: Jul. 20, 1999

[54] DEVICE FOR MEASURING THE VOLUME OF A FLOWING MEDIUM

[75] Inventors: Dieter Tank, Eberdingen; Uwe Konzelmann, Asperg, both of Germany

[73] Assignee: Robert Bosch GmbH, Stuttgart, Germany

[21] Appl. No.: 08/860,376

[22] PCT Filed: Jul. 24, 1996

[86] PCT No.: PCT/DE96/01359

§ 371 Date: Jun. 26, 1997

§ 102(e) Date: Jun. 26, 1997

[87] PCT Pub. No.: WO97/23767

PCT Pub. Date: Jul. 3, 1997

[30] Foreign Application Priority Data

Dec. 21, 1995 [DE] Germany .......................... 195 47 915

[51] Int. Cl.[6] .............. G01M 19/00; G01F 1/68
[52] U.S. Cl. ................. 73/118.2; 73/202.5; 73/204.22
[58] Field of Search .................. 73/202.5, 204.21, 73/118.2, 204.22

[56] References Cited

U.S. PATENT DOCUMENTS

| | | | |
|---|---|---|---|
| 4,942,763 | 7/1990 | Harpster | 73/198 |
| 4,955,230 | 9/1990 | Hall | 73/204.21 |
| 4,981,035 | 1/1991 | Hall | 73/204.21 |
| 5,024,083 | 6/1991 | Inada et al. | 73/204.21 |
| 5,086,650 | 2/1992 | Harrington et al. | 73/204.21 |
| 5,467,648 | 11/1995 | Igarashi et al. | 73/118.2 |

FOREIGN PATENT DOCUMENTS 4407209  7/1995  Germany .

*Primary Examiner*—Harshad Patel
*Attorney, Agent, or Firm*—Edwin E. Greigg; Ronald E. Greigg

[57] ABSTRACT

A device for measuring the mass of a flowing medium aspirated by internal combustion engines is secured in an intake line. The device protrudes into the intake line with a measuring part that has a measuring conduit, and has a measuring element, accommodated in the measuring conduit (20), and facing in a direction of the flowing medium. The device is mounted in the intake line such that the measuring part with the measuring conduit is rotated by an angle a relative to the medium flowing in the intake line. The invention is contemplated for measuring the mass of a flowing medium, in particular for measuring the mass of air aspirated by internal combustion engines.

3 Claims, 1 Drawing Sheet

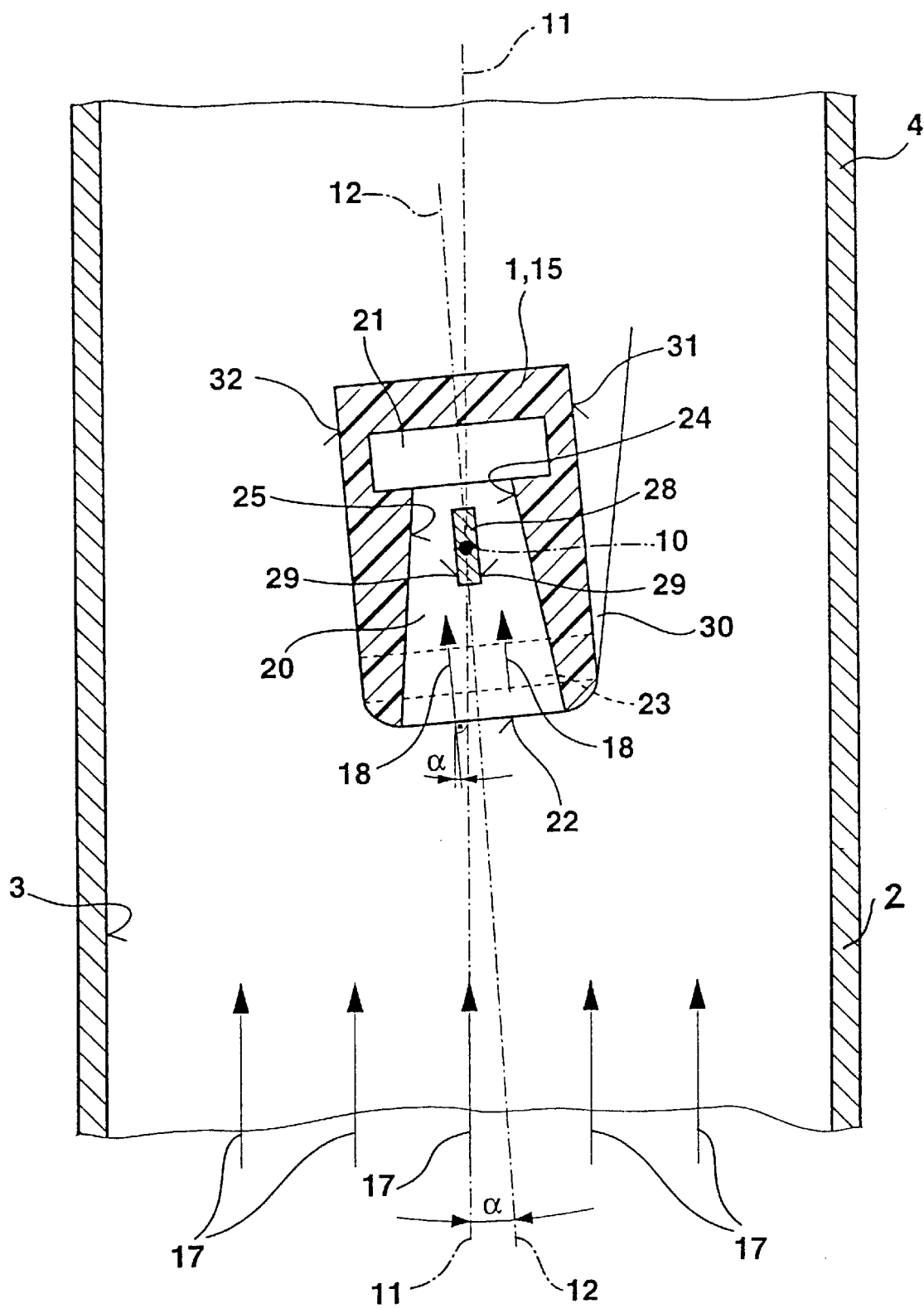

1

DEVICE FOR MEASURING THE VOLUME OF A FLOWING MEDIUM

PRIOR ART

The invention is based on a device for measuring the mass of a flowing medium. A device is already known (German Offenlegungsschrift 44 07 209) that is intended for measuring the mass of air aspirated by an internal combustion engine and to that end has a measuring element accommodated in a measuring conduit. The measuring element is embodied for instance in the form of a ceramic substrate or as a micromechanical component. The device has a slender, elongated, parallelepiped shape extending radially in the direction of an insertion axis and is introduced into an opening of a wall of an intake line. The wall of the intake line defines a flow cross section, which in the case of a cylindrical intake line is approximately circular. By way of example, the intake line is an intake tube of an internal combustion engine, through which the engine can aspirate air from the environment. The device is fixed in its radial position in the opening of the wall of the intake line in such a way that the measuring conduit of the measuring part of the device is oriented parallel to the medium flowing in the intake line. In the radial direction, the measuring part of the device preferably protrudes approximately to the middle of the flow cross section of the intake line. For mounting and radially fixing the position of the device on the intake line, openings are provided, for instance in a part of the device housing located outside the intake line, and screws can be introduced into these openings to connect the device to the intake line.

In mass production of the device or mass-production mounting of it on the intake line, however, installation tolerances are unavoidable, and as a result the measuring conduit of the measuring part of the device is not always aligned exactly parallel with the medium flowing in the intake line but instead can deviate somewhat from that orientation. A deviation from the intended parallel installed position of the measuring conduit, however, can lead to unstable flow conditions at the measuring part or in the measuring conduit, which are characterized by a switchover of the flow from laminar to turbulent, for instance, and as a result more or less major variations in the characteristic curves of the mounted devices can occur.

ADVANTAGES OF THE INVENTION

The device according to the invention for measuring the mass of a flowing, has the advantage over the prior art that variations in the characteristic curves resulting from installation tolerances are markedly reduced, so that in mass production or mounting of the device, essentially constant characteristic curves without variations can be expected.

By the provisions recited herein advantageous further features of and improvements to the device are possible.

BRIEF DESCRIPTION OF THE DRAWING

One exemplary embodiment of the invention is shown in simplified form in the drawing and described in further detail in the ensuing description.

DESCRIPTION OF THE EXEMPLARY EMBODIMENT

The drawing in a sectional view shows part of a device 1 that serves to measure the mass of a flowing medium, especially the mass of air aspirated by internal combustion engines. The complete structure of such a device can be learned from German Offenlegungsschrift 44 07 209, for instance, whose disclosure is hereby incorporated by reference. The device 1 preferably has a slender, elongated parallelepiped form extending radially in the direction of an insertion axis 10. The insertion axis 10 is represented in the drawing by a dot and extends into the plane of the drawing, vertically to the plane of the drawing. The device 1 is introduced in a known manner into an opening made in a wall 2 of an intake line 4 and is secured to the intake line 4, for instance by a screw connection. By way of example, the intake line 4 is an intake tube of a mixture-compressing internal combustion engine with externally supplied ignition, through which tube the engine can aspirate air from the environment. The intake line 4 defines a flow cross section, which in the case of a cylindrical intake line 4 is an approximately circular cross section, in the middle of which, in the axial direction of the flowing medium represented by arrows 17, an axis 11 extends parallel to an inner wall 3 of the intake line 4. The device 1 extends radially, so that a parallelepiped measuring part 15 of the device 1, shown shaded in the drawing and having a rectangular cross section, protrudes for instance into the middle of the flow cross section of the intake line 4.

In the measuring part 15 of the device 1, an axially extending measuring conduit 20 and a deflection conduit 21, for instance S-shaped, that adjoins it radially are provided. The medium flowing in the intake line 4 enters the measuring conduit 20 via an inlet orifice 22, which for example has a rectangular cross section, and passes from the measuring conduit 20 into the deflection conduit 21, leaving it by an outlet opening 23 shown in dashed lines and extending radially, for instance. The measuring conduit 20 has two side faces 24, 25, which are embodied as converging toward one another in the axial direction toward the deflection conduit 21, in the direction of a measuring conduit axis 12 extending centrally in the measuring conduit 20. Both the measuring conduit axis 12 of the measuring conduit 20 and the axis 11 of the intake line 4 are oriented at right angles to the insertion axis 10. In the measuring conduit 20, a measuring element 28 is accommodated, which is divided for instance centrally by the measuring conduit axis 12 into two equal-sized halves; it is embodied for instance in the form of a platelike ceramic substrate and is oriented with its side faces 29 parallel to the measuring conduit axis 12, so that the medium flowing in the measuring conduit 20 bathes it. It is also possible, as disclosed for instance in German Offenlegungsschrift 43 38 891, for the measuring element 28 to be embodied as a micromechanical component with a dielectric diaphragm. The effect of the tapering embodiment of the measuring conduit 20 is that a virtually unimpeded, uniform parallel flow prevails in the region of the measuring element 28, extending along the measuring conduit axis 12 and represented in the drawing by arrows 18.

According to the invention, the measuring conduit 20 has its measuring conduit axis 12 aligned not parallel to the axis 11 of the intake line 4 but rather rotated by an angle $\alpha$ relative to the axis 11 or to the medium flowing in the intake line 4. Because of the rotated installed position of the measuring part 15 or measuring conduit 20, a unilateral separation zone 30 represented by a line in the drawing is created in the flow downstream of the inlet orifice 22 at the circumference of the measuring part 15; this zone causes a stable flow state, which in particular is not characterized by flow switchovers, upstream of the inlet orifice 22 of the measuring conduit 20. The separate zone 30 extends from the inlet orifice 22 along an outer face 31 of the measuring part 15 that extends downstream in the intake line 4, in the course of which a reapplication of the flow to the outer face 31 does not occur. The separation zone 30 is limited essentially to the side of the measuring part 15 that is turned away from the flow 17 in the direction toward the wall 2 of the intake line 4; in other words, the outer face 31 is located in the lee of the right front edge of the measuring part 15. On the opposite side of the measuring part 15 oriented toward the flow 17, or on its outer face 32 toward the flow 17, no such separation zone, or only a negligibly small separation zone, results. The outer faces 31 and 32 extend parallel to the measuring conduit axis 12. It has been found that given the described rotation of the measuring part 15, a stable flow state upstream of the inlet orifice 22, if the measuring conduit 20 is installed radially, is effectively established whenever a radial rotary position of the measuring conduit 20 relative to the medium 17 flowing in the intake line 4 at an angle $\alpha$ of approximately 2° to approximately 10° and preferably approximately 4° is selected. As shown in the drawing, the angle $\alpha$ is enclosed by the measuring conduit axis 12 and the axis 11 of the intake line 4. The medium in the measuring conduit 20 flowing axially in the intake line 4 flows substantially parallel to the measuring conduit axis 12 of the measuring conduit 20 and therefore likewise forms the angle $\alpha$ relative to the medium flowing in the intake line 4. The measuring element 28 does not change its position in the measuring conduit 20 despite the rotated position of the measuring part 15, and accordingly assumes the same inclination relative to the axis 11 of the intake line 4 as the measuring conduit axis 12.

Because of the stable flow conditions that become established upstream of the measuring conduit 20 in the intended angular range $\alpha$ from approximately 2° to 10°, installation tolerances that lead to a further change in the angle $\alpha$ or in the radial rotary position of the measuring conduit 20 have less effect on the flow measuring conduit 20 and thus on the electrical signal output by the measuring element 28 than would be the case if the measuring conduit 20 had a parallel orientation. Therefore in mass production or mounting of the device 1, no variations or only insignificant variations in the characteristic curves of the installed devices 1 are to be expected. The drawing shows an installed position of the device 1 that is rotated counterclockwise. It is understood also to be possible for the device 1 to be built in with a clockwise-rotated installed position. As also shown in the drawing, the insertion axis 10 may for instance provided as the pivot axis for the rotated installation of the device 1. It is also possible, however, to provide some other pivot axis, for instance one offset from the insertion axis 10. The foregoing relates to preferred exemplary embodiments of the invention, it being understood that other variants and embodiments thereof are possible within the spirit and scope of the invention, the latter being defined by the appended claims.

We claim:

1. A device for measuring the mass of a flowing medium, especially for measuring the mass of air aspirated by internal combustion engines, in which the device is secured to an air intake line, the device protrudes into the air intake line with a measuring part that extends along a plug-in axis (10) and has a measuring conduit with an inlet opening (22) facing a direction of flow of the flowing medium, the device has a measuring element accommodated in the measuring conduit, said measuring element extends along an axis (12) of the measuring part for measuring the mass of air, the device (1) is mounted in the intake line (4) such that the measuring part (15) with the measuring conduit (20) in which the measuring element is disposed, rotated by an angle a of from about 2 degrees to about 10 degrees formed by an axis of said intake line (4) and an axis of said measuring part and facing in the direction of the flowing medium relative to the medium flowing in the intake line (4), a deflection conduit (21) which is embodied in the measuring part downstream of the measuring conduit (20), and said deflection conduit has an outlet opening (23) which is a continuation of the deflection conduit (21) and said outlet opening is located in a direction toward the plug-in axis (10) in a plane that does not pass through the inlet opening 22 of the measuring conduit (20).

2. A device in accordance with claim 1, in which the angle $\alpha$ amounts to approximately 4°.

3. A device as set forth in claim 1 in which said conduit (20), said deflection conduit and said outlet opening is formed in a S-shape.

\* \* \* \* \*